US012738737B2

(12) United States Patent
Lee

(10) Patent No.: US 12,738,737 B2

(45) Date of Patent: Sep. 15, 2026

(54) ELECTRONIC DEVICE FOR MONITORING ABNORMAL STATE OF ENERGY CONSUMPTION AND METHOD OF OPERATING THE SAME

(71) Applicant: Electronics and Telecommunications Research Institute, Daejeon (KR)

(72) Inventor: Jihyun Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 364 days.

(21) Appl. No.: 18/518,730

(22) Filed: Nov. 24, 2023

(65) Prior Publication Data

US 2024/0213772 A1 Jun. 27, 2024

(30) Foreign Application Priority Data

Dec. 26, 2022 (KR) ........................ 10-2022-0185012
Oct. 13, 2023 (KR) ........................ 10-2023-0136638

(51) Int. Cl.
*H02J 3/00* (2026.01)
*G05B 19/048* (2006.01)
(Continued)

(52) U.S. Cl.
CPC ............ *H02J 3/003* (2020.01); *G05B 19/048* (2013.01); *G05B 2219/25387* (2013.01);
(Continued)

(58) Field of Classification Search
CPC .... H02J 3/003; H02J 2103/30; H02J 2105/12; H02J 2105/52; G05B 19/048; G05B 2219/25387; G05B 2219/2639
See application file for complete search history.

(56) References Cited

U.S. PATENT DOCUMENTS

2013/0204417 A1* 8/2013 Matsumaru ............ G05B 19/18
700/95
2014/0142904 A1* 5/2014 Drees ..................... G06Q 10/04
703/2

(Continued)

FOREIGN PATENT DOCUMENTS

JP 7054487 B1 4/2022
KR 10-1917157 B1 11/2018

(Continued)

OTHER PUBLICATIONS

Hamadouche, Anis, Abdelmalek Kouadri, and Abderazak Bensmail. "Kernelized relative entropy for direct fault detection in industrial rotary kilns." International Journal of Adaptive Control and Signal Processing 32.7 (2018): 967-979 (Year: 2018).*

(Continued)

*Primary Examiner* — Christopher E. Everett
(74) *Attorney, Agent, or Firm* — LRK PATENT LAW FIRM

(57) ABSTRACT

Disclosed are an electronic device for monitoring an abnormal state of energy consumption and a method of operating the same. The method includes receiving factory data related to product production of a factory and energy used in the factory, determining an energy stability indicator (ESI) indicating an amount of the energy used for the product production based on the factory data, generating a normalized energy stability indicator distribution (ESID) with respect to a preset time period based on the ESI, determining a distribution difference by comparing the generated ESID and a reference distribution predetermined for energy consumption of the factory, and outputting one or more observed variables for monitoring an abnormal state of consumption of the energy with respect to a period in which the distribution difference is large.

14 Claims, 6 Drawing Sheets

(51) Int. Cl.
*H02J 103/30* (2026.01)
*H02J 105/12* (2026.01)
*H02J 105/52* (2026.01)

(52) U.S. Cl.
CPC ... *G05B 2219/2639* (2013.01); *H02J 2103/30* (2026.01); *H02J 2105/12* (2026.01); *H02J 2105/52* (2026.01)

(56) References Cited

U.S. PATENT DOCUMENTS

2014/0142905 A1* 5/2014 Drees .................... G06F 30/20 703/2
2015/0217657 A1 8/2015 Kang et al.
2019/0034309 A1* 1/2019 Nayak .................... F24F 11/65
2019/0391573 A1* 12/2019 Wang ................ G05B 23/0254
2021/0240167 A1* 8/2021 Kang .................. G06N 3/0455
2022/0146996 A1 5/2022 Shin

FOREIGN PATENT DOCUMENTS

KR 10-2019-0142600 A 12/2019
KR 10-2190845 B1 12/2020
KR 10-2222852 B1 3/2021
KR 10-2299698 B1 9/2021
KR 10-2022-0164124 A 12/2022
KR 10-2480280 B1 12/2022

OTHER PUBLICATIONS

Z. Huo, M. Martínez-García, Y. Zhang, R. Yan and L. Shu, “Entropy Measures in Machine Fault Diagnosis: Insights and Applications,” in IEEE Transactions on Instrumentation and Measurement, vol. 69, No. 6, pp. 2607-2620, Jun. 2020 (Year: 2020).*

* cited by examiner

200

300

ELECTRONIC DEVICE FOR MONITORING ABNORMAL STATE OF ENERGY CONSUMPTION AND METHOD OF OPERATING THE SAME

CROSS-REFERENCE TO RELATED APPLICATIONS

This application claims the benefit of Korean Patent Application No. 10-2022-0185012 filed on Dec. 26, 2022, and Korean Patent Application No. 10-2023-0136638 filed on Oct. 13, 2023, in the Korean Intellectual Property Office, the entire disclosures of which are incorporated herein by reference for all purposes.

BACKGROUND

1. Field of the Invention

One or more embodiments relate to an electronic device for monitoring an abnormal state of energy consumption and a method of operating the same.

2. Description of Related Art

Technology for optimizing energy consumption while securing the quantity of products produced in factories is being studied. Factories may consume energy in the process of producing qualified products, which are normal products, or defective products, which are abnormal products. The state of energy consumption in factories may be divided into a stable state in which the energy consumption to the quantity of products produced is stable and an abnormal state in which the energy consumption to the quantity of products produced is greater than the stable state or energy is consumed to produce defective products. To optimize the energy consumption of a factory, technology for monitoring whether the energy consumption is in a stable state or an abnormal state may be used.

SUMMARY

Technology for monitoring an abnormal state of energy consumption may obtain state information on the energy consumption of a factory and provide the state information to a manager who manages energy consumption. The manager may monitor and analyze the state information, thereby determining a measure to optimize the energy consumption based on intuitive interpretation and judgment. In addition, the technology for monitoring an abnormal state of energy consumption may make it difficult for the manager to determine the time or time period when an abnormal state of energy consumption occurs and to perform a timely analysis of the relationship among factors causing the abnormal state.

Various embodiments may determine whether an abnormal state occurs by comparing the energy consumption of a factory with that in a stable state, and provide the time or time period when the abnormal condition occurs.

Various embodiments may output observed variables for monitoring an abnormal state of energy consumption and provide correlation coefficients for a linear relationship therebetween, when an abnormal state occurs in the energy consumption of a factory.

Other objects and advantages of the present disclosure can be understood by the following description and will become more apparent by the embodiments of the present disclosure. In addition, it will be apparent that the objects and advantages of the present disclosure can be readily realized by the means and combinations thereof recited in the claims.

According to an aspect, there is provided a method of operating an electronic device, the method including receiving factory data related to product production of a factory and energy used in the factory, determining an energy stability indicator (ESI) indicating an amount of the energy used for the product production based on the factory data, generating a normalized energy stability indicator distribution (ESID) with respect to a preset time period based on the ESI, determining a distribution difference by comparing the generated ESID and a reference distribution predetermined for energy consumption of the factory, and outputting one or more observed variables for monitoring an abnormal state of consumption of the energy with respect to a period in which the distribution difference is large.

The determining of the distribution difference may be based on relative entropy using information entropy with respect to the predetermined reference distribution and the generated ESID.

The determining of the distribution difference may include determining the distribution difference to be a difference between cross entropy between the generated ESID and the predetermined reference distribution and entropy of the predetermined reference distribution.

The outputting of the one or more observed variables may include determining one or more correlation coefficients for a linear relationship between the one or more observed variables, and outputting the one or more correlation coefficients.

The outputting of the one or more observed variables may include outputting the one or more observed variables by sorting the one or more correlation coefficients in order of high correlation coefficient, or outputting observed variables having correlation coefficients exceeding a predetermined value, among the one or more correlation coefficients.

The factory data may include information about products produced in the factory, a quantity of the products produced, the amount of the energy used, and the one or more observed variables.

The determining of the ESI may include determining the ESI by dividing the amount of the energy used by a quantity of products produced.

The generating of the ESID may include generating a probability density function with respect to the ESI determined for the preset time period.

The receiving, the determining, the generating, and the outputting may be performed iteratively for an inspection period predetermined for monitoring the abnormal state.

The predetermined reference distribution may be an ESID determined to be ideal in a process of iterating the receiving, the determining, the generating, and the outputting.

According to an aspect, there is provided an electronic device including a processor configured to receive factory data related to product production of a factory and energy used in the factory, determine an ESI indicating an amount of the energy used for the product production based on the factory data, generate a normalized ESID with respect to a preset time period based on the ESI, determine a distribution difference by comparing the generated ESID and a reference distribution predetermined for energy consumption of the factory, and output one or more observed variables for monitoring an abnormal state of consumption of the energy with respect to a period in which the distribution difference is large.

The processor may be further configured to determine the distribution difference based on relative entropy using information entropy with respect to the predetermined reference distribution and the generated ESID.

The processor may be further configured to determine the distribution difference to be a difference between cross entropy between the generated ESID and the predetermined reference distribution and entropy of the predetermined reference distribution.

The processor may be further configured to determine one or more correlation coefficients for a linear relationship between the one or more observed variables, and output the one or more correlation coefficients.

The processor may be further configured to output the one or more observed variables by sorting the one or more correlation coefficients in order of high correlation coefficient, or output observed variables having correlation coefficients exceeding a predetermined value, among the one or more correlation coefficients.

The factory data may include information about products produced in the factory, a quantity of the products produced, the amount of the energy used, and the one or more observed variables.

The processor may be further configured to determine the ESI by dividing the amount of the energy used by a quantity of products produced.

The processor may be further configured to generate a probability density function with respect to the ESI determined for the preset time period.

The processor may be further configured to iteratively perform the receiving, the determining, the generating, and the outputting for an inspection period predetermined for monitoring the abnormal state.

The predetermined reference distribution may be an ESID determined to be ideal in a process of iterating the receiving, the determining, the generating, and the outputting.

Additional aspects of embodiments will be set forth in part in the description which follows and, in part, will be apparent from the description, or may be learned by practice of the disclosure.

According to various embodiments, it is possible to verify whether an abnormal state occurs in energy consumption by monitoring the energy consumption of a factory.

According to various embodiments, it is possible to help seek a measure to handle an abnormal state by providing the time or time period when an abnormal state occurs in energy consumption.

According to various embodiments, it is possible to simplify an operation of monitoring to inspect factors causing energy waste among the factors affecting energy consumption.

According to various embodiments, it is possible to help seek a measure to handle an abnormal state by providing one or more observed variables for monitoring an abnormal state of energy consumption and one or more correlation coefficients for a linear relationship therebetween.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Figure 1:
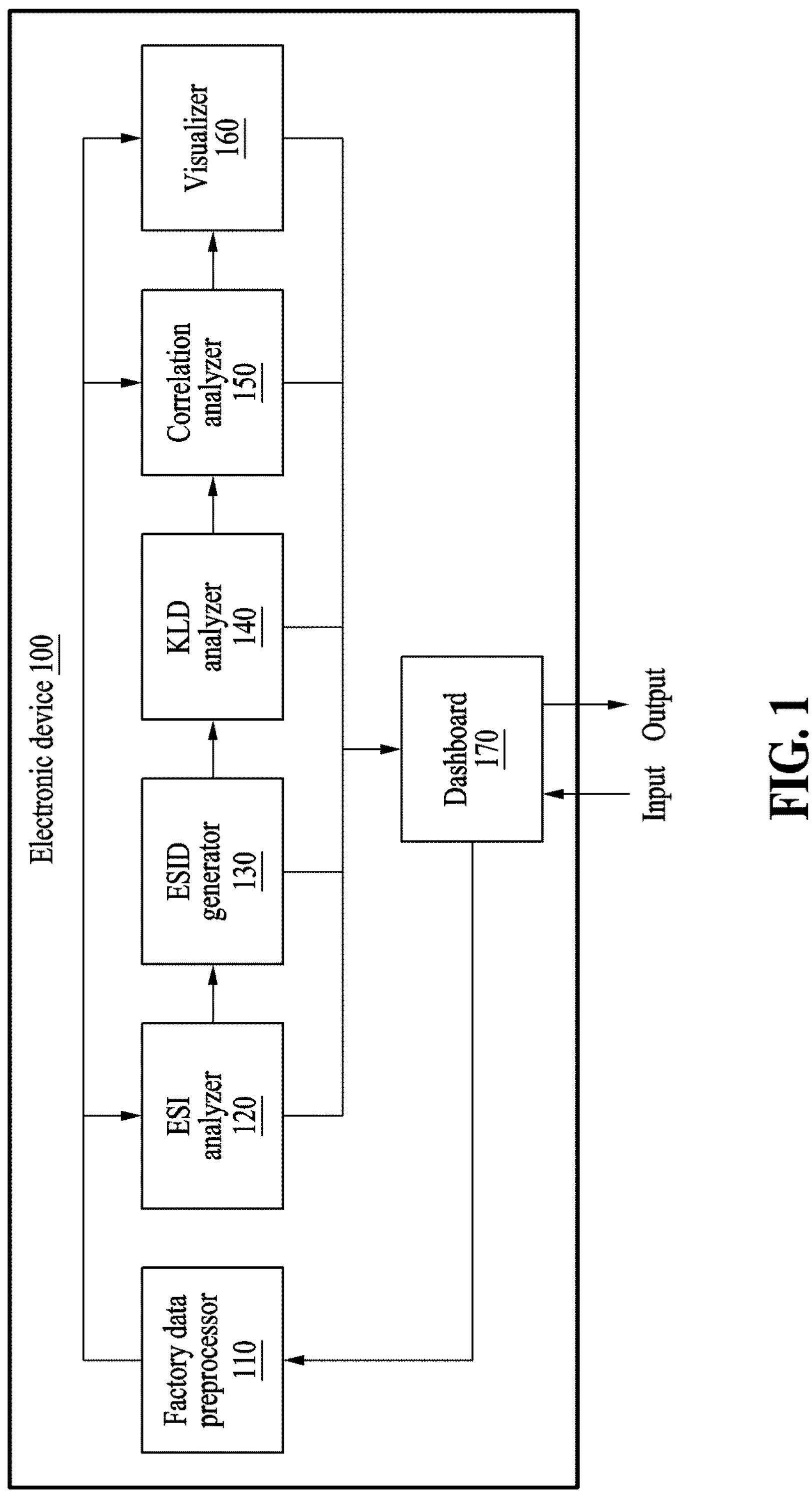
FIG. 1 is a diagram illustrating the structure of an electronic device for monitoring an abnormal state of energy consumption according to an embodiment.

The following detailed structural or functional description is provided as an example only and various alterations and modifications may be made to the embodiments. Here, the embodiments are not construed as limited to the disclosure and should be understood to include all changes, equivalents, and replacements within the idea and the technical scope of the disclosure.

As used herein, "A or B", "at least one of A and B", "at least one of A or B", "A, B or C", "at least one of A, B and C", "at least one of A, B, or C", and "one or a combination of at least two of A, B, and C," each of which may include any one of the items listed together in the corresponding one of the phrases, or all possible combinations thereof. Terms, such as first, second, and the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

It should be noted that if it is described that one component is "connected", "coupled", or "joined" to another component, a third component may be "connected", "coupled", and "joined" between the first and second components, although the first component may be directly connected, coupled, or joined to the second component.

As used herein, the singular forms "a", "an", and "the" include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, embodiments will be described in detail with reference to the accompanying drawings. When describing the embodiments with reference to the accompanying drawings, like reference numerals refer to like elements and a repeated description related thereto will be omitted.

FIG. 1 is a diagram illustrating the structure of an electronic device for monitoring an abnormal state of energy consumption according to an embodiment.

Referring to FIG. 1, an example of the structure of an electronic device 100 for monitoring an abnormal state of energy consumption, the electronic device 100 including a factory data preprocessor 110, an energy stability indicator (ESI) analyzer 120, an energy stability indicator distribution (ESID) generator 130, a Kullback-Leibler divergence (KLD) analyzer 140, a correlation analyzer 150, a visualizer 160, and a dashboard 170 is shown. FIG. 1 shows the factory data preprocessor 110, the ESI analyzer 120, the ESID generator 130, the KLD analyzer 140, the correlation analyzer 150, and the visualizer 160 as devices for performing predetermined functions, but embodiments are not limited thereto. The factory data preprocessor 110, the ESI analyzer 120, the ESID generator 130, the KLD analyzer 140, the correlation analyzer 150, and the visualizer 160 may be implemented as programs executed by a processor.

The factory data preprocessor 110 may receive factory data related to product information about products produced in a factory, the quantity of products produced, an energy consumption, and observed variables related to energy consumption, and may preprocess the factory data to be analyzed. The factory data preprocessor 110 may preprocess the factory data using preprocessing conditions for factory data received from the dashboard 170. The preprocessing conditions for factory data may be based on information input into the dashboard 170 (e.g., a data analysis section, a product type, etc.).

The ESI analyzer 120 may determine an ESI indicating the amount of energy used for product production. According to an embodiment, the ESI analyzer 120 may determine the ESI for product production of the factory based on the preprocessed factory data from the factory data preprocessor 110. The ESI may indicate the amount of energy consumed to produce products to the quantity of products produced, as shown in Equation 1 below.

$$ESI = \text{Amount of Energy Used (ton)/Quantity of Products Produced (ton)} \quad \text{[Equation 1]}$$

In other words, the ESI may be calculated by dividing the amount of energy used by the quantity of products produced. The ESI may be calculated per unit time (e.g., 1 minute, 1 hour, etc.) while one product is produced. In addition, the ESI analyzer 120 may calculate statistical values such as the average, variance, standard deviation, maximum value, minimum value, or number of data for the ESI. The ESI analyzer 120 may transmit the ESI and/or the statistical values for the ESI to the dashboard 170 for output.

The ESID generator 130 may generate a normalized ESID with respect to a preset time period based on the ESI. According to an embodiment, the ESID generator 130 may receive information on the ESI and a task request signal from the ESI analyzer 120 to generate an ESID. The ESID may be a probability density function for an ESI determined for a preset time period. The ESID generator 130 may transmit the generated ESID to the dashboard 170 for output.

In response to a task request signal from the ESID generator 130, the KLD analyzer 140 may determine a distribution difference by comparing the generated ESID with a predetermined reference distribution. The reference distribution is intended for comparison with the generated ESID and may be an ESID when products are produced with ideal consumption of energy in a factory. The reference distribution may be an ESID determined to be ideal by iterating an operation of receiving factory data and outputting observed variables and correlation coefficients. The KLD analyzer 140 may use information entropy of information theory to compare the ESID with the reference distribution. Information entropy H(P) for an arbitrary probability distribution P(x) may be expressed by Equation 2 below.

$$H(P) = E\left[\log\frac{1}{P_i(x)}\right],\ E[X] = \sum xP(x) \quad \text{[Equation 2]}$$

In Equation 2, E[x] denotes an expected value of the probability distribution P(x) for an event x.

$$E\left[\log\frac{1}{P_i(x)}\right]$$

may indicate how important the event x is for the probability distribution P(x) in terms of information and may numerically express the amount of information in the probability distribution P(x). The amount of information in the arbitrary probability distribution P(x) may be expressed as an expected value of the reciprocal of a probability value for a logarithmic indicator. P(x) may be a value between "0" and "1", wherein the more the amount of information may be infinite as the probability is closer to "0", and the amount of information may be "0" as the probability is closer to "1". In other words, events with large information entropy having low probability may occur rarely, and events with small information entropy having high probability may occur relatively frequently.

When comparing the ESID and the reference distribution, the KLD analyzer 140 may determine the distribution difference based on relative entropy using information entropy. The relative entropy may indicate a KLD. The KLD may indicate a change in information entropy when a probability distribution Q(x) that approximates P(x) is used instead of the arbitrary probability distribution P(x). The KLD analyzer 140 may calculate the KLD through Equation 3 below.

$$D_{KL}(P\|Q) = H(P, Q) - H(P) = -\sum_i p_i \log_2 q_i + \sum_i p_i \log_2 p_i = \sum_i P(i)\log\frac{P(i)}{Q(i)} \quad \text{[Equation 3]}$$

In Equation 3, $D_{KL}(P\|Q)$ denotes the KLD for the probability distributions P(x) and Q(x), and H(P, Q) denotes cross entropy, which is entropy when the probability distribution Q(x) is used instead of P(x).

According to an embodiment, the KLD analyzer 140 may determine the distribution difference determined by comparing the ESID and the reference distribution to be a difference between cross entropy between the ESID and the reference distribution and entropy of the reference distribution. For example, P(x) may indicate a reference distribution that is an ESID during a time period between t to (t+n), and Q(x) may be a distribution for optimizing energy consumption that is an ESID when products are produced in the factory during a time period between (t+m) to (t+m+n). In this case, the relative entropy $D_{KL}(P||Q)$ between P(x) and Q(x) may indicate the area of a region outside the distribution and thus, may indicate the distribution difference between P(x) and Q(x). As the area outside the distribution of P(x) and Q(x) increases, the distribution difference may increase, and as the area outside the distribution decreases, the distribution difference may decrease. In other words, as Q(x) has more outliers than P(x), the distribution difference may increase, and as Q(x) has fewer outliers than P(x), the distribution difference decrease. In addition, the KLD analyzer 140 may transmit the distribution difference determined by comparing the ESID and the reference distribution to the dashboard 170 for output. The operation of generating the ESID and comparing the ESID with the reference distribution by the ESID generator 130 and the KLD analyzer 140 will be described in detail with reference to FIGS. 2 and 3.

In response to a task request signal from the KLD analyzer 140, the correlation analyzer 150 may determine one or more correlation coefficients for the linear relationship between the one or more observed variables received from the factory data preprocessor 110. The observed variables may be variables observed in relation to the energy consumption of the factory. A correlation coefficient may be an indicator that numerically expresses the linear relationship between two observed variables. The correlation analyzer 150 may calculate a correlation coefficient between two observed variables $x_i$ and $y_i$ through Equation 4 below.

$$r = \frac{\sum[(x_i - \overline{x})(y_i - \overline{y})]}{\sqrt{\sum(x_i - \overline{x})^2 * \sum(y_i - \overline{y})^2}} \quad \text{[Equation 4]}$$

In Equation 4, r denotes the correlation coefficient, and $\overline{x}$ and $\overline{y}$ denote the means of $x_i$ and $y_i$ for all i, respectively. As the correlation coefficient is closer to +1 or −1, the linear relationship may be stronger, and as the correlation coefficient is closer to "0", the linear relationship may be weaker. The correlation analyzer 150 may determine that two observed variables having a correlation coefficient greater than a predetermined value have a strong correlation. For example, the correlation analyzer 150 may determine that two variables having a correlation coefficient greater than or equal to 0.7 or less than or equal to −0.7 have a strong correlation. The correlation analyzer 150 may transmit the one or more correlation coefficients and correlation analysis results to the dashboard 170 for output.

In response to a task request signal from the correlation analyzer 150, the visualizer 160 may visualize the one or more observed variables received from the factory data preprocessor 110. The visualizer 160 may visualize the one or more observed variables and the correlation coefficients for the one or more observed variables in a graph or table. In addition, the visualizer 160 may output the one or more observed variables by sorting the one or more correlation coefficients in order of high correlation coefficient or output observed variables having correlation coefficients greater than the predetermined value, based on the determined one or more correlation coefficients. The operation of determining the one or more observed variables and determining and visualizing the one or more correlation coefficients by the correlation analyzer 150 and the visualizer 160 will be described in detail below with reference to FIG. 4.

Figure 2:
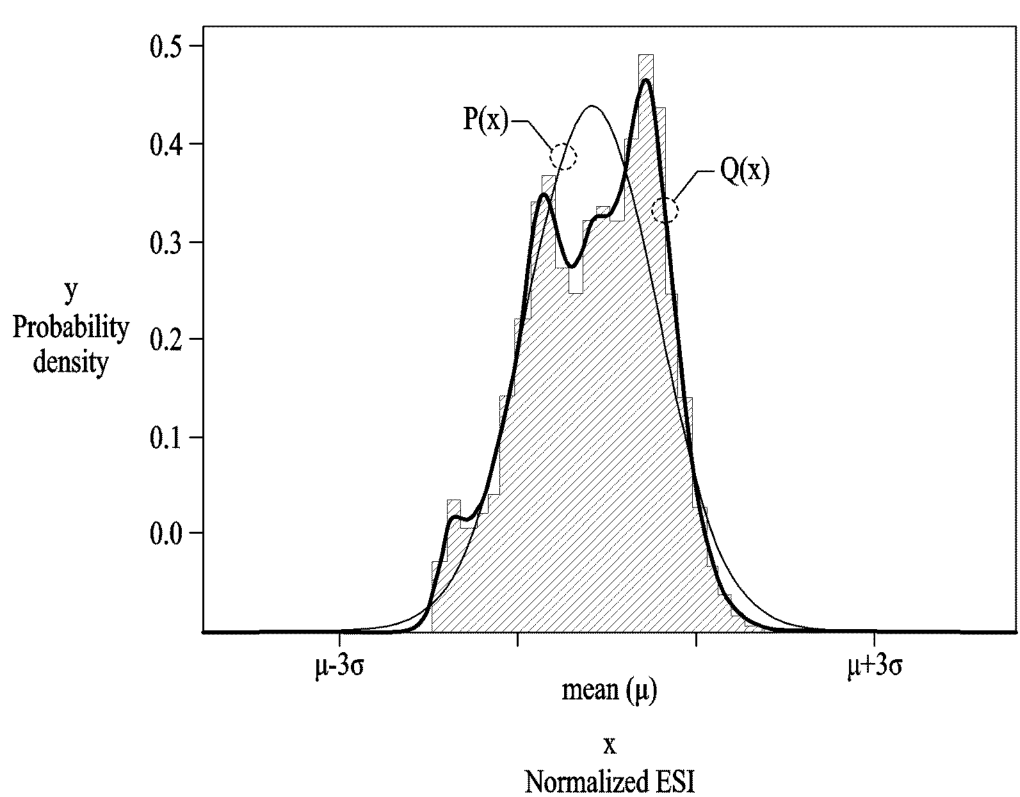
FIG. 2 is a graph illustrating an operation for generating an energy stability indicator distribution (ESID) and comparing the ESID with a reference distribution according to an embodiment.

FIG. 2 is a graph illustrating an operation for generating an energy stability indicator distribution (ESID) and comparing the ESID with a reference distribution according to an embodiment.

Referring to FIG. 2, an example of an ESID graph 200 that compares the ESID Q(x) generated by the ESID generator 130 with the predetermined reference distribution P(x) is shown.

The reference distribution P(x) in the ESID graph 200 may be an ideal distribution of ESI for energy consumption for product production in a factory. In FIG. 2, the reference distribution P(x) has the form of a normal distribution for description, but the embodiments are not limited thereto. The reference distribution P(x) may have a form set by a manager or determined to be ideal.

The generated ESID Q(x) in the ESID graph 200 may be an ESID for the actual energy consumption when products are produced in the factory during a predetermined time period. In FIG. 2, the reference distribution P(x) is shown as a graph having a predetermined shape for description, but the embodiments are not limited thereto. The reference distribution P(x) may have a different graph form according to the actual amount of energy used for product production and the time period.

In the ESID graph 200, the x-axis may represent a normalized ESI, and the y-axis may represent a probability density. According to an embodiment, the distribution difference between Q(x) and P(x) may be numerically calculated in the ESID graph 200. The method of calculating the distribution difference between Q(x) and P(x) using the KLD has been described in detail above and thus, will be omitted. The ESID graph 200 may be output through a dashboard so as to be monitored by the manager periodically or as needed.

Figure 3:
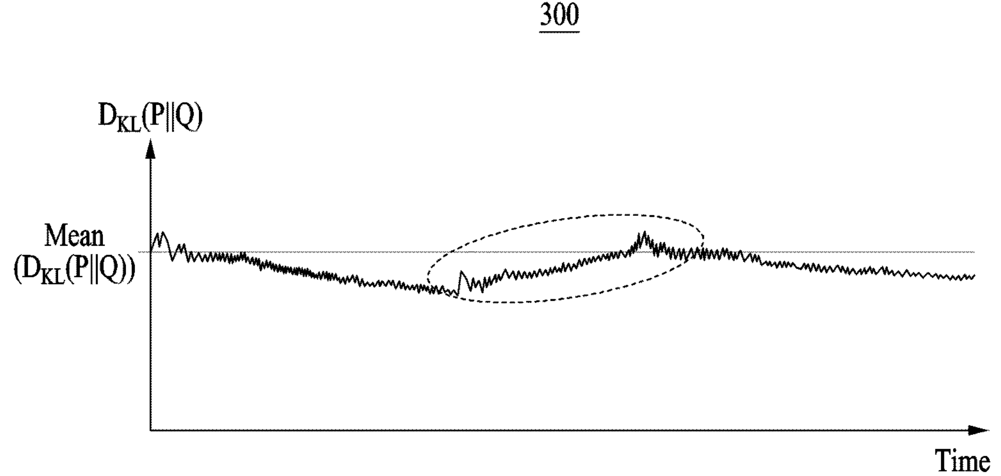
FIG. 3 is a graph illustrating an operation of determining a distribution difference by comparing an ESID with a reference distribution according to an embodiment.

FIG. 3 is a graph illustrating an operation of determining a distribution difference by comparing an ESID with a reference distribution according to an embodiment.

Referring to FIG. 3, a distribution difference graph 300 that determines the distribution difference by comparing the ESID Q(x) and the predetermined reference distribution P(x) over time and compares the distribution difference over time with the mean for the distribution difference is shown. In FIG. 3, $D_{KL}(P||Q)$ denotes the distribution difference, and the mean($D_{KL}(P||Q)$) denotes the mean for the distribution difference.

Referring to the distribution difference of a portion marked in a broken-lined ellipse in the distribution difference graph 300, the graph shows a pattern in which the distribution difference increases more than the mean for the distribution difference lasts for a certain period of time. The pattern with increasing distribution difference may indicate that energy is consumed in a different pattern from the reference distribution in the factory and that the energy consumption is becoming unstable. According to an embodiment, observed variables may be output to monitor the period in which the distribution difference increases, and correlation coefficients between the observed variables may be output.

Figure 4:
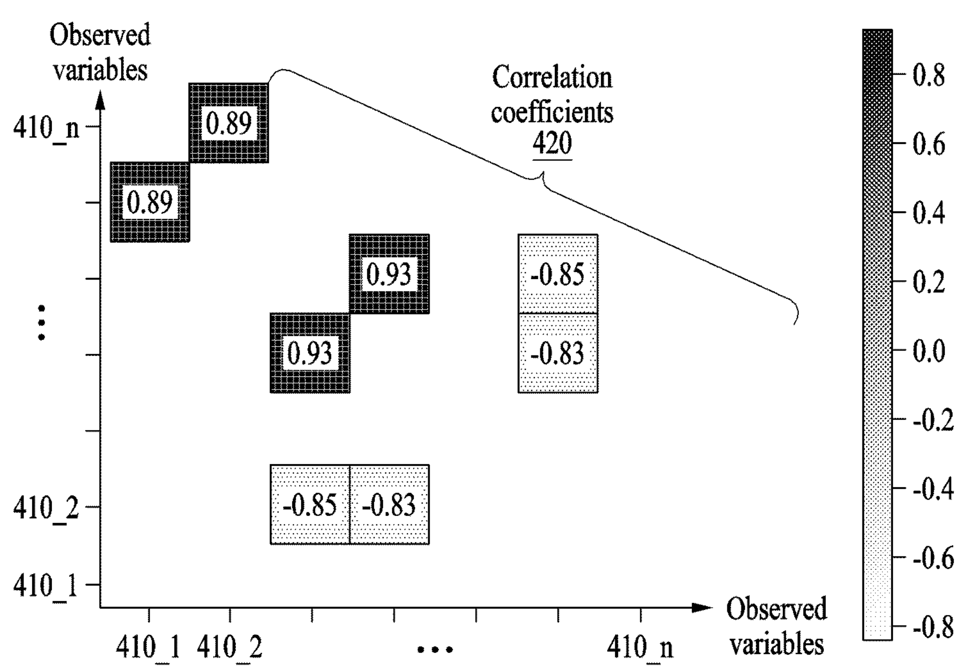
FIG. 4 is a graph illustrating an operation of outputting one or more observed variables and one or more correlation coefficients for monitoring an abnormal state of energy consumption according to an embodiment.

FIG. 4 is a graph illustrating an operation of outputting one or more observed variables and one or more correlation coefficients for monitoring an abnormal state of energy consumption according to an embodiment.

Referring to FIG. 4, a correlation coefficient graph 400 for visualizing correlation coefficients 420 calculated for one or more observed variables 410_1 to **410_*n*** is shown.

The meaning of the observed variables and the method of determining the correlation coefficients have been described in detail above and thus, will be omitted.

The correlation coefficients 420 for the one or more observed variables 410_1 to **410_*n* may be calculated to monitor changes in the one or more observed variables 410_1 to 410_*n* that occur in a period in which the distribution difference increases. The calculated correlation coefficients 420 may be displayed and visualized for respective observed variable pairs. As shown in the correlation coefficient graph 400, only observed variable pairs having correlation coefficients 420 greater than a predetermined value may be displayed to easily determine an observed variable pair having a strong correlation, and the correlation coefficients 420 may be displayed differently in brightness or chroma based on their values. In addition, the one or more observed variables 410_1 to 410_*n* may be output by sorting the one or more correlation coefficients in order of high correlation coefficient 420. For example, as shown in FIG. 4, only observed variable pairs having correlation coefficients 420 of 0.7 or greater or −0.7 or less may be displayed on the correlation coefficient graph 400, or the correlation coefficients 420** may be displayed in darker colors as having a stronger positive correlation and in brighter colors as having a stronger negative correlation, as shown in the brightness scale on the right.

The visualized correlation coefficient graph 400 may be output through a dashboard for monitoring. A manager may change the settings or control of a product production facility of a factory through the visualized correlation coefficient graph 400.

When a predetermined inspection period (e.g., one week, one month, or one quarter, etc.) arrives for periodic monitoring, the manager may review past analysis records. In order to derive a correlation to be reflected in the control of the production facility, the one or more observed variables 410_1 to **410*n* may be output in an extended observation period so that the correlation of the one or more observed variables 410_1 to 410_*n*** may be reviewed for each period. In addition, a function for monitoring results (e.g., an ESI value, an ESID graph, a KLD trend, rankings of observed variables for correlation, and a pattern of real-time observed values of observed variables) output for the extended observation period may be provided. According to an embodiment, the operations of the electronic device described above may be performed iteratively during a predetermined inspection period.

In addition, if necessary, the reference distribution may be replaced with an ESID determined by the manager to be ideal for the energy consumption of products. The ESID determined to be ideal in the monitoring process may be managed separately so as to be selected and used for future analysis.

Figure 5:
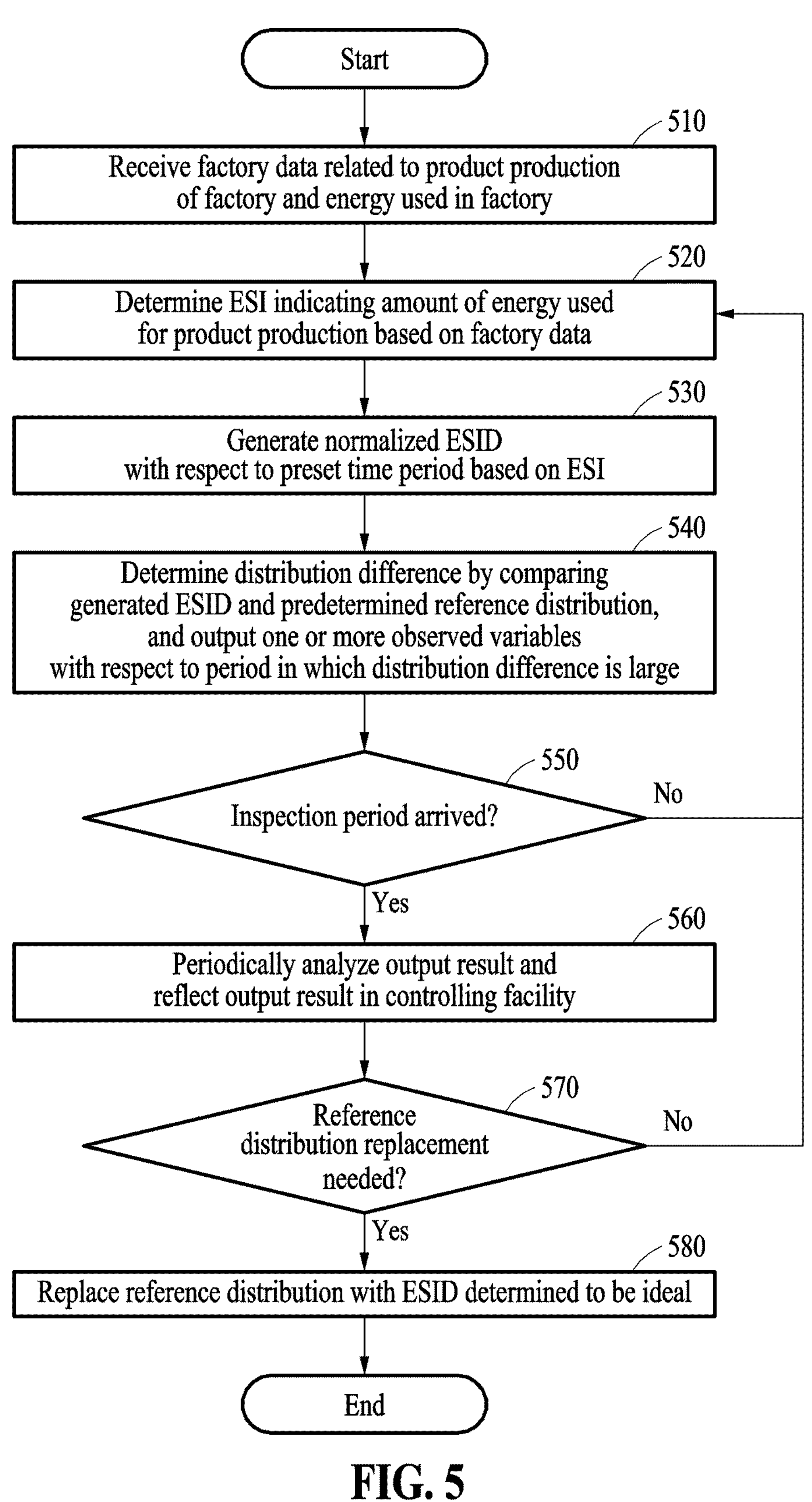
FIG. 5 is a schematic flowchart of an electronic device for monitoring an abnormal state of energy consumption according to an embodiment.

FIG. 5 is a schematic flowchart of an electronic device for monitoring an abnormal state of energy consumption according to an embodiment.

In the following embodiments, operations may be performed sequentially, but are not necessarily performed sequentially. For example, the operations may be performed in different orders, and at least two of the operations may be performed in parallel. Operations 510 to 540 may be performed by at least one component (e.g., a processor) of an electronic device.

In operation 510, the electronic device may receive factory data related to product production of a factory and energy used in the factory.

In operation 520, the electronic device may determine an ESI indicating the amount of the energy used for the product production based on the factory data. The electronic device may determine a distribution difference based on relative entropy using information entropy with respect to the predetermined reference distribution and the generated ESID. The electronic device may determine the distribution difference to be a difference between cross entropy between the generated ESID and the predetermined reference distribution and entropy of the predetermined reference distribution. The electronic device may determine the ESI by dividing the amount of the energy used by the quantity of products produced.

In operation 530, the electronic device may generate a normalized ESID with respect to a preset time period based on the ESI. The electronic device may generate a probability density function with respect to the ESI determined for the preset time period.

In operation 540, the electronic device may determine a distribution difference by comparing the generated ESID and a reference distribution predetermined for energy consumption of the factory, and output one or more observed variables for monitoring an abnormal state of consumption of the energy with respect to a period in which the distribution difference is large. The electronic device may determine one or more correlation coefficients for the linear relationship between the one or more observed variables, and output the one or more correlation coefficients. The electronic device may output the one or more observed variables by sorting the one or more correlation coefficients in order of high correlation coefficient, or output observed variables having correlation coefficients exceeding a predetermined value, among the one or more correlation coefficients.

The factory data may include information about products produced in the factory, the quantity of the products produced, the amount of the energy used, and the one or more observed variables. The predetermined reference distribution may be an ESID determined to be ideal in the process of iterating the receiving, the determining, the generating, and the outputting.

In operation 550, a manager may determine whether a predetermined inspection period for periodically monitoring the energy consumption of the factory arrived. The electronic device may iteratively perform the receiving, the determining, the generating, and the outputting for the predetermined inspection period.

In response to the determination that the inspection period arrived in operation 550, the manager may periodically analyze the output result from the electronic device and reflect the output result in controlling the facility, in operation 560.

In operation 570, the manager may determine whether a replacement of the reference distribution is needed.

In response to the determination that the replacement of the reference distribution is needed in operation 570, the manager may replace the reference distribution with an ESID determined to be ideal, in operation 580. The manager may select and manage the ESID determined to be ideal for each product.

Figure 6:
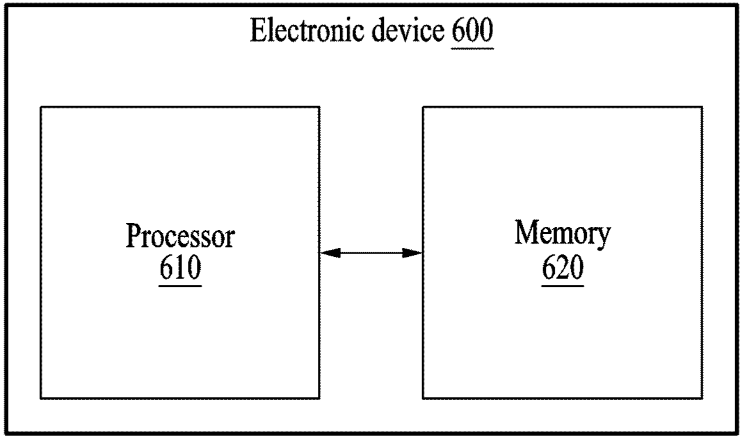
FIG. 6 is a schematic block diagram of an electronic device for monitoring an abnormal state of energy consumption according to an embodiment.

FIG. 6 is a schematic block diagram of an electronic device for monitoring an abnormal state of energy consumption according to an embodiment.

Referring to FIG. 6, an electronic device 600 may include a processor 610. The processor 610 may include at least one processor. The electronic device 600 may further include a memory 620.

The memory 620 may store instructions (e.g., programs) executable by the processor 610. For example, the instructions may include instructions for performing an operation of the processor 610 and/or an operation of each component of the processor 610.

The processor 610 may be a device that executes instructions or programs or controls the electronic device 600 and may include, for example, various processors such as a central processing unit (CPU) and a graphics processing unit (GPU). The processor 610 may receive factory data related to product production of a factory and energy used in the factory. The processor 610 may determine an ESI indicating the amount of the energy used for the product production based on the factory data. The processor 610 may generate a normalized ESID with respect to a preset time period based on the ESI. The processor 610 may determine the distribution difference by comparing the generated ESID and a reference distribution predetermined for energy consumption of the factory, and output one or more observed variables for monitoring an abnormal state of consumption of the energy with respect to a period in which the distribution difference is large.

The processor 610 may determine a distribution difference based on relative entropy using information entropy with respect to the predetermined reference distribution and the generated ESID. The processor 610 may determine the distribution difference to be a difference between cross entropy between the generated ESID and the predetermined reference distribution and entropy of the predetermined reference distribution. The processor 610 may determine one or more correlation coefficients for the linear relationship between the one or more observed variables, and output the one or more correlation coefficients. The processor 610 may output the one or more observed variables by sorting the one or more correlation coefficients in order of high correlation coefficient, or output observed variables having correlation coefficients exceeding a predetermined value, among the one or more correlation coefficients. The processor 610 may determine the ESI by dividing the amount of the energy used by the quantity of products produced. The processor 610 may generate a probability density function with respect to the ESI determined for the preset time period. The processor 610 may iteratively perform the receiving, the determining, the generating, and the outputting for an inspection period predetermined for monitoring the abnormal state.

The factory data may include information about products produced in the factory, the quantity of the products produced, the amount of the energy used, and the one or more observed variables. The predetermined reference distribution may be an ESID determined to be ideal in the process of iterating the receiving, the determining, the generating, and the outputting. In addition, the electronic device 600 may process the operations described above.

The components described in the embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the embodiments may be implemented by software, and the software may be recorded on a recording medium. The components, the functions, and the processes described in the embodiments may be implemented by a combination of hardware and software.

The units described herein may be implemented using a hardware component, a software component and/or a combination thereof. A processing device may be implemented using one or more general-purpose or special-purpose computers, such as, for example, a processor, a controller and an arithmetic logic unit (ALU), a DSP, a microcomputer, an FPGA, a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or uniformly instruct or configure the processing device to operate as desired. Software and data may be stored in any type of machine, component, physical or virtual equipment, or computer storage medium or device capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described embodiments may be recorded in non-transitory computer-readable media including program instructions to implement various operations of the above-described embodiments. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter.

The above-described devices may be configured to act as one or more software modules in order to perform the operations of the above-described examples, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

What is claimed is:

1. A method of operating an electronic device, the method comprising:

receiving factory data related to product production of a factory and energy used in the factory;

determining an energy stability indicator (ESI) indicating an amount of the energy used for the product production based on the factory data, for each of a plurality of time instances within a preset time period;

generating a normalized energy stability indicator distribution (ESID) with respect to the preset time period based on a plurality of ESI values determined during the preset time period;

determining a distribution difference based on relative entropy using information entropy by comparing the generated ESID and a reference distribution predetermined for energy consumption of the factory, each of the generated ESID and the reference distribution being a distribution of ESI values; and outputting one or more observed variables for monitoring an abnormal state of consumption of the energy with respect to a period in which the distribution difference is large, wherein data of the ESID is n-dimensional time-series data, wherein the relative entropy indicates Kullback-Leibler divergence (KLD), wherein the generating of the ESID comprises generating a probability density function with respect to the plurality of ESI values determined for the preset time period, and wherein the outputting of the one or more observed variables determines one or more correlation coefficients for a linear relationship between the one or more observed variables and outputs the one or more observed variables by sorting the one or more correlation coefficients in order of high correlation coefficient.

2. The method of claim 1, wherein the determining of the distribution difference comprises determining the distribution difference to be a difference between cross entropy between the generated ESID and the predetermined reference distribution and entropy of the predetermined reference distribution.

3. The method of claim 1, wherein the outputting of the one or more observed variables comprises outputting observed variables having correlation coefficients exceeding a predetermined value, among the one or more correlation coefficients.

4. The method of claim 1, wherein the factory data comprises information about products produced in the factory, a quantity of the products produced, the amount of the energy used, and the one or more observed variables.

5. The method of claim 1, wherein the determining of the ESI comprises, for each of the plurality of time instances, determining the ESI by dividing the amount of the energy used by a quantity of products produced.

6. The method of claim 1, wherein the receiving, the determining, the generating, and the outputting are performed iteratively for an inspection period predetermined for monitoring the abnormal state.

7. The method of claim 1, wherein the predetermined reference distribution is an ESID determined to be ideal in a process of iterating the receiving, the determining, the generating, and the outputting.

8. An electronic device comprising:

a processor configured to:

receive factory data related to product production of a factory and energy used in the factory, determine an energy stability indicator (ESI) indicating an amount of the energy used for the product production based on the factory data, for each of a plurality of time instances within a preset time period, generate a normalized energy stability indicator distribution (ESID) with respect to the preset time period based on a plurality of ESI values determined during the preset time period, determine a distribution difference based on relative entropy using information entropy by comparing the generated ESID and a reference distribution predetermined for energy consumption of the factory, each of the generated ESID and the reference distribution being a distribution of ESI values, and output one or more observed variables for monitoring an abnormal state of consumption of the energy with respect to a period in which the distribution difference is large, wherein data of the ESID is n-dimensional time-series data, wherein the relative entropy indicates Kullback-Leibler divergence (KLD), wherein the processor is further configured to generate a probability density function with respect to the plurality of ESI values determined for the preset time period, determine one or more correlation coefficients for a linear relationship between the one or more observed variables, and output the one or more observed variables by sorting the one or more correlation coefficients in order of high correlation coefficient.

9. The electronic device of claim 8, wherein the processor is further configured to determine the distribution difference to be a difference between cross entropy between the generated ESID and the predetermined reference distribution and entropy of the predetermined reference distribution.

10. The electronic device of claim 8, wherein the processor is further configured to output observed variables having correlation coefficients exceeding a predetermined value, among the one or more correlation coefficients.

11. The electronic device of claim 8, wherein the factory data comprises information about products produced in the factory, a quantity of the products produced, the amount of the energy used, and the one or more observed variables.

12. The electronic device of claim 8, wherein the processor is further configured to determine, for each of the plurality of time instances, the ESI by dividing the amount of the energy used by a quantity of products produced.

13. The electronic device of claim 8, wherein the processor is further configured to iteratively perform the receiving, the determining, the generating, and the outputting for an inspection period predetermined for monitoring the abnormal state.

14. The electronic device of claim 8, wherein the predetermined reference distribution is an ESID determined to be ideal in a process of iterating the receiving, the determining, the generating, and the outputting.

* * * * *